(12) United States Patent
Mooney

(10) Patent No.: US 6,943,518 B1
(45) Date of Patent: Sep. 13, 2005

(54) TECHNIQUE FOR CALIBRATING A CURRENT CONTROL CIRCUIT

(75) Inventor: John D. Mooney, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/828,848

(22) Filed: Apr. 20, 2004

(51) Int. Cl.[7] ............................................ G01R 31/00
(52) U.S. Cl. .................... 318/490; 73/862.68; 324/649; 702/85
(58) Field of Search ........................ 318/490; 73/862, 73/892.08, 862.191, 862.193, 862.68; 324/600, 324/691, 719, 76, 11; 702/79, 85, 89, 105

(56) References Cited

U.S. PATENT DOCUMENTS

| | | | |
|---|---|---|---|
| 3,911,354 A | * | 10/1975 | Stanton ....................... 323/276 |
| 5,796,545 A | * | 8/1998 | Canclini ................... 360/78.04 |
| 5,920,004 A | * | 7/1999 | Gottshall et al. ............ 73/1.36 |
| 6,788,490 B2 | * | 9/2004 | Schillaci et al. ......... 360/78.04 |

* cited by examiner

Primary Examiner—Bentsu Ro
(74) Attorney, Agent, or Firm—Stefan V. Chmielewski

(57) ABSTRACT

A technique for calibrating a current control circuit includes a number of steps. One step includes setting a conduction time of a low-side switch, which is coupled between a low-side of the load and ground, to provide a desired load current to a load. Another step includes determining a high-side load current on a high-side of the load, which is coupled to a power source, when a low-side load current on the low-side of the load transitions through a first predetermined reference level. Yet another step includes establishing a first correction factor based upon the high-side load current and the low-side load current. Still another step includes adjusting the conduction time of the low-side switch based on the first correction factor to provide the desired load current to the load.

18 Claims, 2 Drawing Sheets

TECHNIQUE FOR CALIBRATING A CURRENT CONTROL CIRCUIT

TECHNICAL FIELD

The present invention is generally directed to a current control circuit and, more specifically, to a technique for calibrating a current control circuit.

BACKGROUND OF THE INVENTION

A typical automotive engine management system (EMS) includes numerous electromagnetic actuators that are controlled by an electronic control module (ECM). One technique for performing actuator control involves current modulation to achieve a desired actuator current to operate an armature of the actuator. In various applications, it is desirable that the EMS measure an actuator current on a high-side of the load, i.e., actuator coil, when the high-side of the load is either at EMS voltage or, in some applications, boosted EMS voltage. Measurement of the current provided to the load can become problematic, as the measurement must take place in the presence of high common mode voltage. A classical method of current measurement involves the insertion of a known resistance in the current path and the measurement of the resulting voltage drop across the resistance. However, for systems that have high actuator currents, it is generally desirable to utilize a relatively low value resistor to achieve acceptable component power dissipations.

Traditionally, due to economic considerations, a current mirror has been utilized to make load current measurements. Unfortunately, current mirrors are notoriously inaccurate, due to variations in transistor parameters. Further, in a system that implements a current mirror to measure a high-side load current, the system may suffer from degraded actuator performance in that the actuator current may not be controlled within desired parameters. Additionally, such systems typically use a metal-oxide semiconductor field-effect transistor (MOSFET) to act as a low-side switch, i.e., a switch placed between a low-side of the load and ground. MOSFET drive circuits, associated with the MOSFET, typically exhibit overshoot and undershoot errors due to drive circuit component tolerances. These current overshoot and undershoot errors may also lead to degraded actuator performance.

Historically, ECMs have been factory calibrated to provide a desired actuator current to a given actuator. However, in such factory calibrated systems, the calibration is fixed for the life of the product and is valid only if the ECM and actuator performance do not drift over the product lifetime. Further, the calibration is dependent on accurate correlation between the load, used during calibration, and the actual load of the end application. It should be appreciated that this necessitates tight tolerance requirements on the actuator, and accordingly, increased actuator cost. Additionally, ECM components will inevitably drift over the life of the system, which will result in degraded actuator performance. Given that the calibration is performed at a single ECM temperature, the calibration also does not necessarily mitigate errors over the operational temperature range of the ECM. In addition, traditional calibration processes have increased manufacturing capital equipment requirements and manufacturing cycle times and have, thus, led to increased product cost.

What is needed is a technique for calibrating a current control circuit that provides adequate current measurement accuracy, without the need for factory calibration using external equipment. It would also be desirable if the calibrated current control circuit was capable of compensating for drift in component tolerances over the life of the product.

SUMMARY OF THE INVENTION

According to the present invention, a technique for calibrating a current control circuit comprises a number of steps. One step includes setting a conduction time of a low-side switch, which is coupled between a low-side of the load and ground, to provide a desired load current to a load. Another step includes determining a high-side load current on a high-side of the load, which is coupled to a power source, when a low-side load current on a low-side of the load transitions through a first predetermined reference level. Another step includes establishing a first correction factor based upon the high-side load current and the low-side load current. Yet another step includes adjusting the conduction time of the low-side switch based on the first correction factor to provide the desired load current to the load.

According to another aspect of the present invention, the high-side load current is determined by measuring a voltage drop across a sense resistor positioned in a first leg of a current mirror. In this embodiment, the second leg of the current mirror includes a high-side resistor coupled in series between the power source and the load.

According to a different embodiment of the present invention, the step of establishing a first correction factor based upon the high-side load current and the low-side load current includes the step of periodically modifying the first correction factor, based on a value of the high-side load current, when the low-side load current transitions through the first predetermined reference level.

According to yet another aspect of the present invention, the technique includes a number of additional steps. One step includes determining the high-side load current when the low-side load current on the low-side of the load transitions through a second predetermined reference level. Another step includes establishing a second correction factor, based upon the high-side load current and the low-side load current, when the low-side load current transitions through the second predetermined reference level. Yet another step includes adjusting the conduction time of the low-side switch based on the first and second correction factors to provide the desired load current to the load.

According to a different aspect of the present invention, the step of establishing a second correction factor based upon the high-side load current and the low-side load current includes the step of periodically modifying the second correction factor based on a value of the high-side load current when the low-side load current transitions through the second predetermined reference level.

These and other features, advantages and objects of the present invention will be further understood and appreciated by those skilled in the art by reference to the following specification, claims and appended drawings.

BRIEF DESCRIPTION OF THE DRAWINGS

The present, invention will now be described, by way of example, with reference to the accompanying drawings, in which.

DESCRIPTION OF THE PREFERRED EMBODIMENTS

Figure 1:
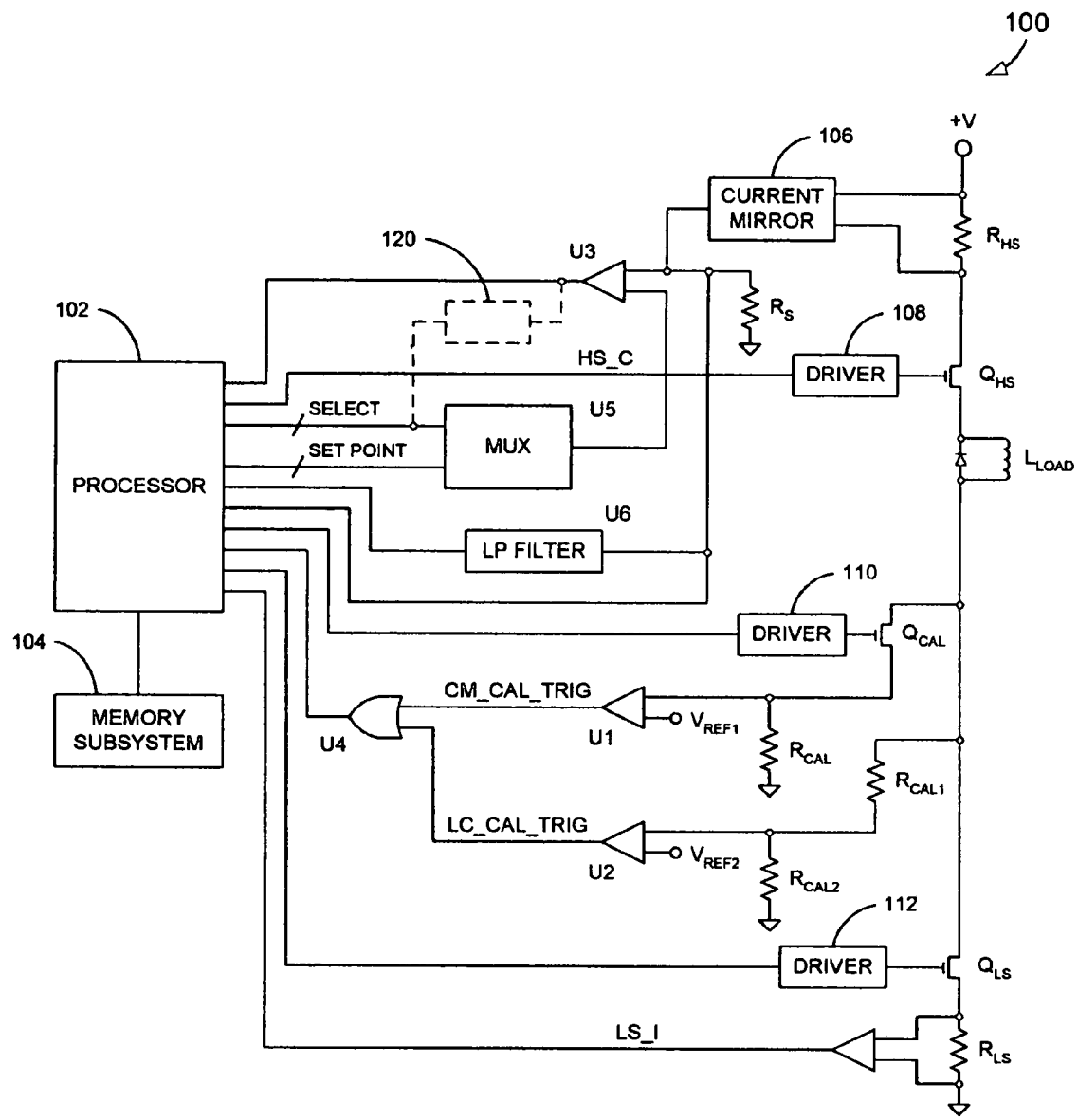
FIG. 1 is an electrical block diagram of an electronic control module for controlling and calibrating a current control circuit.
Figure 2:
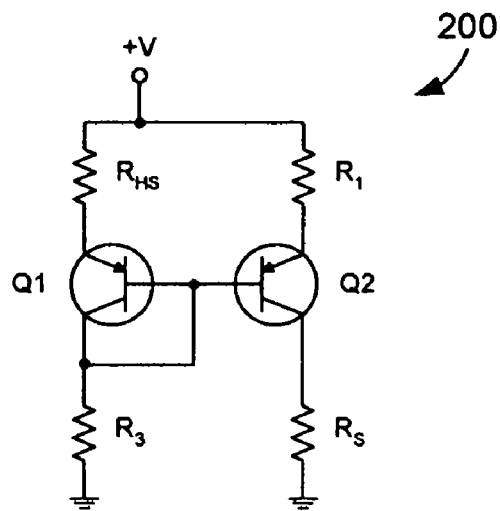
FIG. 2 is an electrical diagram of an exemplary current mirror.
Figure 3:
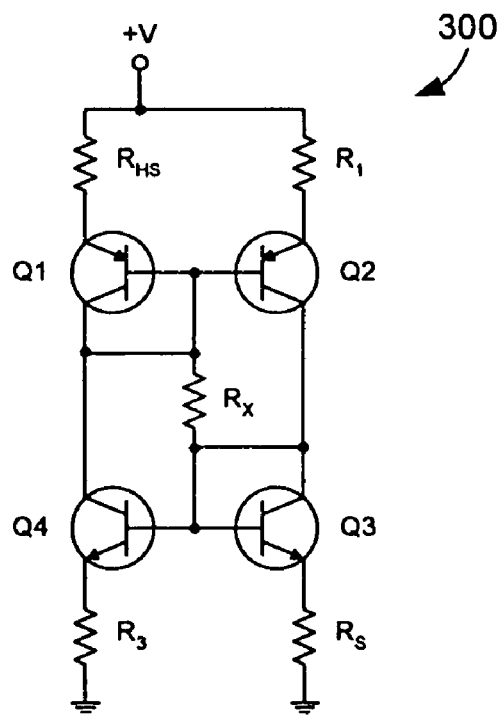
FIG. 3 is an electrical block diagram of another exemplary current mirror.

According to the present invention, an electronic control module (ECM) is disclosed that acts as a current control circuit for an actuator. An ECM constructed according to the present invention is able to compensate for drift in component tolerances over the life of an associated product and is able to automatically calibrate the current control circuit to achieve a satisfactory load current accuracy. In typical operation, the processor 102 controls a high-side transistor $Q_{HS}$, via a driver circuit 108, and a low-side transistor $Q_{LS}$, via a driver circuit 112. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The high-side and low-side transistors may be, for example, insulated-gate bipolar transistors (IGBTs) or metal-oxide field-effect transistors (MOSFETs).

In general operation, a gate of the transistor $Q_{HS}$ is discretely enabled and a gate of the transistor $Q_{LS}$ is pulse width modulated (PWM) to provide an average current to the load $L_{LOAD}$. The load current causes a voltage drop across a sense resistor $R_S$, which is coupled to one leg of a current mirror circuit 106, which includes, as a component thereof, a high-side resistor $R_{HS}$, which is coupled between a power supply +V and a terminal (drain) of the transistor $Q_{HS}$. The processor 102 is programmed to provide a plurality of pulse width modulated (PWM) signals that provide different average set-points, which are voltage signals of different levels, to inputs of a multiplexer (MUX) U5. The processor 102 is also coupled to a plurality of select lines of the MUX U5. The select lines are controlled by the processor 102 (or alternatively control circuit 120) to select one of the set-points provided at the inputs of the MUX U5. An output of the MUX U5 is coupled to a second input of a comparator U3, whose first input is coupled to a high-side of the resistor $R_S$.

An output of the comparator U3 is coupled to a first input of the processor 102. The level of the output of the comparator U3 provides an indication to the processor 102 as to whether the current through the resistor $R_{HS}$ is above or below a desired level, set at the second input of the comparator U3 (as provided by the MUX U5). Alternatively, the circuit 120 may be coupled to an output of the comparator U3 to control the select lines of the MUX U5 and, thus, in this embodiment, offload control of the select lines from the processor 102. The voltage at the output of the MUX U5, i.e., at the second input of the comparator U3, corresponds to a desired load current, as determined by the processor 102. The current comparator U3 compares the analog signals provided at its second and first inputs, i.e., provided at the output of the MUX U5 and a voltage dropped across the resistor $R_S$, thus, providing an indication of whether the high-side load current is at a desired level.

The processor 102 controls a duty cycle of a control signal provided to a control terminal, i.e., a gate, of the transistor $Q_{LS}$, via the driver circuit 112, to achieve a desired load current level. As is described in further detail below, the set-point provided at the output of the MUX U5 provides a voltage signal that is used to maintain calibration of the high-side load current provided to the load. During calibration, the processor 102 monitors a calibration trigger input, which is coupled to an output of the OR gate U4, to determine whether a trigger signal CM_CAL_TRIG has occurred. When a trigger occurs on the calibration trigger input of the processor 102, the processor 102 measures a voltage present at a load current input, which is coupled to a high-side of the resistor $R_S$.

During calibration, the processor 102 provides a signal to a gate of the transistor $Q_{CAL}$, via a driver circuit 110, to turn the transistor $Q_{CAL}$ on, which results in a current being conducted through the resistor $R_{CAL}$. When voltage dropped across the resistor $R_{CAL}$ is equal to the reference voltage $V_{REF1}$, set on a first input of the comparator U1, a trigger is provided to a first input of the OR gate U4 and, accordingly, is provided to the calibration trigger input of the processor 102. As discussed above, upon receiving the calibration trigger, the processor 102 measures the voltage present at its load current input. Thus, when the processor 102 receives a calibration trigger, it knows that the low-side current is equal to $V_{REF1}$ divided by $R_{CAL}$ and, based upon the voltage measured across the resistor $R_S$, the processor 102 calculates the current through $R_S$ and, thus, the high-side current provided to the load. The voltage is then utilized to normalize the current mirror 106 output and, thus, compensate for current mirror 106 inaccuracies.

That is, since the low-side current is known, the processor 102 can determine whether the high-side current is equal to the low-side current and, if not, apply an appropriate correction factor. The processor 102 may then select a different set-point to be provided at an output of the MUX U5 to adjust the reference voltage provided to the second input of the comparator U3. The processor 102 may then adjust the duty cycle of the pulse width modulated (PWM) signal provided to the control terminal of the transistor $Q_{LS}$ to achieve a desired load current.

Looking at the present invention in another way, a technique for calibrating a current control circuit includes a number of steps. One step includes initially setting a conduction time of a low-side switch to provide a desired load current to a load. Another step involves determining a high-side load current on a high-side of the load when a low-side load current on a low-side of the load transitions through a first predetermined reference level. Still another step includes establishing a first correction factor (set-point), based upon the high-side load current and the low-side load current. A final step involves adjusting the conduction time of the low-side switch based on the first correction factor (set-point) to provide the desired load current to the load.

After calibration, the current mirror 106 output current is known to accurately represent the current in the load. However, due to output drive circuit variability, i.e., the component variations of the driver circuit 112, load current measurement errors may remain. These load current measurement variations can be compensated for by a number of techniques. For example, a low-side voltage sense comparator U2 may be implemented to allow for correction of errors produced due to variations in the output drive circuit components. As is shown, a pair of resistors, $R_{CAL1}$ and $R_{CAL2}$, are serially coupled, to form a voltage divider, to the low-side of the load $L_{LOAD}$. A first input of the comparator U2 receives a reference voltage level $V_{REF2}$ and a second input of the comparator U2 is coupled to a high-side of the resistor $R_{CAL2}$. The voltage dropped across the resistor $R_{CAL2}$ then provides a timing trigger coincident with the peaks/valleys of the low-side load current.

Similar as to what is discussed above, when the current through the resistor $R_{CAL2}$ reaches the voltage $V_{REF2}$, the low-side voltage sense comparator U2 provides a trigger signal LC_CAL_TRIG to an input of the OR gate U4, which provides a calibration trigger to the calibration trigger input of the processor 102, which, upon receiving the trigger, measures the voltage across the resistor $R_S$. In this manner, the processor 102 can obtain an accurate measurement of load current peaks and troughs and, thus, utilize this data to select an appropriate set-point to be provided at the output of the MUX U5 and, accordingly, to the second input of the comparator U3.

Alternatively, the signal at the first input of the comparator U3 can be averaged (low-pass filtered) over a period of time, to remove high frequency components and pass a signal representative of an average load current. In this embodiment, the average load current measurement can then be used to determine the magnitude of the error introduced by the variability of the drive circuit 112 switching time. According to this embodiment, the error introduced by the output drive circuit 112 switching time can be removed by altering the set-point until a desired average current is obtained, as is discussed above.

Accordingly, techniques for calibrating a current control circuit for an actuator has been described herein that may be advantageously implemented within an engine management system that includes numerous electromagnetic actuators that are controlled by an electronic control module. In general, such a system allows for a lower cost current mirror circuit to be implemented within the current control circuit, while still providing acceptable current measurement capabilities.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for calibrating a current control circuit, comprising the steps of:
    setting a conduction time of a low-side switch to provide a desired load current to a load, wherein the low-side switch is coupled between a low-side of the load and ground;
    determining a high-side load current on a high-side of the load when a low-side load current on a low-side of the load transitions through a first predetermined reference level, wherein the high-side of the load is coupled to a power source;
    establishing a first correction factor based upon the high-side load current and the low-side load current; and
    adjusting the conduction time of the low-side switch based on the first correction factor to provide the desired load current to the load.

2. The method of claim 1, wherein the high-side load current is determined by measuring a voltage drop across a sense resistor positioned in a first leg of a current mirror, and wherein a second leg of the current mirror includes a high-side resistor coupled in series between the power source and the load.

3. The method of claim 1, wherein the step of establishing a first correction factor based upon the high-side load current and the low-side load current includes the step of: periodically modifying the first correction factor based on a value of the high-side load current when the low-side load current transitions through the first predetermined reference level.

4. The method of claim 1, further comprising the steps of:
    determining the high-side load current when the low-side load current on the low-side of the load transitions through a second predetermined reference level;
    establishing a second correction factor based upon the high-side load current and the low-side load current when the low-side load current transitions through the second predetermined reference level; and
    adjusting the conduction time of the low-side switch based on the first and second correction factors to provide the desired load current to the load.

5. The method of claim 4, wherein the low-side switch is a metal-oxide semiconductor field-effect transistor (MOSFET).

6. The method of claim 4, wherein the step of establishing a second correction factor based upon the high-side load current and the low-side load current includes the step of:
    periodically modifying the second correction factor based on a value of the high-side load current when the low-side load current transitions through the second predetermined reference level.

7. An electronic control module, comprising:
    a processor;
    a first current measurement circuit including an output coupled to a first input of the processor, the first current measurement circuit providing a first signal on the output that is indicative of whether a level of a high-side load current provided to a load is at a desired load current level, and wherein the high-side of the load is coupled to a power source;
    a low-side switch including a control terminal and a pair of output terminals, wherein one of the output terminals is coupled to a low-side of the load and the other output terminal is coupled to common, and wherein the control terminal of the low-side switch is coupled to a first output of the processor which provides a pulse width modulated signal to cause the low-side switch to conduct and achieve the desired load current;
    a second current measurement circuit providing a second signal to a second input of the processor when a low-side load current transitions through a first predetermined reference level; and
    a memory subsystem coupled to the processor, the memory subsystem storing code that when executed by the processor instructs the processor to perform the steps of:
        setting a conduction time of the low-side switch to provide the desired load current to the load;
        determining the high-side load current when the low-side load current transitions through the first predetermined reference level; and
        establishing a first correction factor based upon values of the high-side load current and the low-side load current when the low-side load current transitions through the first predetermined reference level; and
        adjusting the conduction time of the low-side switch based on the first correction factor to provide the desired load current to the load.

8. The module of claim 7, further comprising:
    a comparator circuit including a first input, a second input and an output, wherein the first input of the comparator circuit is coupled to the output of the first current measurement circuit, the second input of the comparator circuit is selectively coupled to one of a plurality of PWM outputs of the processor and the output of the comparator circuit is coupled to a third input of the processor, and wherein each of the plurality of PWM outputs of the processor provide a different threshold level and the memory subsystem stores additional code for instructing the processor to perform the additional steps of:

monitoring the output of the comparator circuit at the third input of the processor; and modifying the adjusted conduction time of the low-side switch to provide the desired load current to the load.

9. The module of claim 7, wherein the first current measurement circuit includes a sense resistor positioned in a first leg of a current mirror and the high-side load current is determined by measuring a voltage drop across the sense resistor, and wherein a second leg of the current mirror includes a high-side resistor coupled in series between the power source and the load.

10. The module of claim 7, wherein the step of establishing a first correction factor based upon the high-side load current and the low-side load current includes the step of:

periodically modifying the first correction factor based on a value of the high-side load current when the low-side load current transitions through the first predetermined reference level.

11. The module of claim 7, further comprising the steps of:

determining the high-side load current when the low-side load current on the low-side of the load transitions through a second predetermined reference level;

establishing a second correction factor based upon the high-side load current and the low-side load current when the low-side load current transitions through the second predetermined reference level; and adjusting the conduction time of the low-side switch based on the first and second correction factors to provide the desired load current to the load.

12. The module of claim 11, wherein the low-side switch is a metal-oxide semiconductor field-effect transistor (MOSFET).

13. The module of claim 11, wherein the step of establishing a second correction factor based upon the high-side load current and the low-side load current includes the step of:

periodically modifying the second correction factor based on a value of the high-side load current when the low-side load current transitions through the second predetermined reference level.

14. A method for calibrating a current control circuit, comprising the steps of:

setting a conduction time of a low-side switch to provide a desired load current to a load, wherein the low-side switch is coupled between a low-side of the load and ground;

determining a high-side load current on a high-side of the load when a low-side load current on a low-side of the load transitions through a first predetermined reference level, wherein the high-side of the load is coupled to a power source;

establishing a first correction factor based upon the high-side load current and the low-side load current;

adjusting the conduction time of the low-side switch based on the first correction factor to provide the desired load current to the load;

determining the high-side load current when the low-side load current on the low-side of the load transitions through a second predetermined reference level;

establishing a second correction factor based upon the high-side load current and the low-side load current when the low-side load current transitions through the second predetermined reference level; and adjusting the conduction time of the low-side switch based on the first and second correction factors to provide the desired load current to the load.

15. The method of claim 14, wherein the high-side load current is determined by measuring a voltage drop across a sense resistor positioned in a first leg of a current mirror, and wherein a second leg of the current mirror includes a high-side resistor coupled in series between the power source and the load.

16. The method of claim 14, wherein the step of establishing a first correction factor based upon the high-side load current and the low-side load current includes the step of:

periodically modifying the first correction factor based on a value of the high-side load current when the low-side load current transitions through the first predetermined reference level.

17. The method of claim 14, wherein the low-side switch is a metal-oxide semiconductor field-effect transistor (MOSFET).

18. The method of claim 14, wherein the step of establishing a second correction factor based upon the high-side load current and the low-side load current includes the step of:

periodically modifying the second correction factor based on a value of the high-side load current when the low-side load current transitions through the second predetermined reference level.

* * * * *